(12) United States Patent
Tang et al.

(10) Patent No.: US 12,393,594 B2
(45) Date of Patent: Aug. 19, 2025

(54) TABLE DATA QUERY OF DISTRIBUTED DATABASE

(71) Applicant: BEIJING OCEANBASE TECHNOLOGY CO., LTD., Beijing (CN)

(72) Inventors: Mingdou Tang, Hangzhou (CN); Huang Yu, Hangzhou (CN); Yi Pan, Hangzhou (CN)

(73) Assignee: Beijing Oceanbase Technology Co., Ltd., Beijing (CN)

( * ) Notice: Subject to any disclaimer, the term of this patent is extended or adjusted under 35 U.S.C. 154(b) by 0 days.

(21) Appl. No.: 18/571,058

(22) PCT Filed: Jul. 28, 2022

(86) PCT No.: PCT/CN2022/108511
§ 371 (c)(1),
(2) Date: Dec. 15, 2023

(87) PCT Pub. No.: WO2023/020236
PCT Pub. Date: Feb. 23, 2023

(65) Prior Publication Data
US 2024/0281443 A1  Aug. 22, 2024

(30) Foreign Application Priority Data
Aug. 17, 2021 (CN) .......... 202110943325.3

(51) Int. Cl.
*G06F 16/2455* (2019.01)
*G06F 16/22* (2019.01)
*G06F 16/2458* (2019.01)

(52) U.S. Cl.
CPC .... *G06F 16/24561* (2019.01); *G06F 16/2282* (2019.01); *G06F 16/24552* (2019.01); *G06F 16/2471* (2019.01)

(58) Field of Classification Search
CPC .......... G06F 16/24561; G06F 16/2282; G06F 16/24552; G06F 16/2471; G06F 16/24542; G06F 16/27
See application file for complete search history.

(56) References Cited

U.S. PATENT DOCUMENTS

| | | | | |
|---|---|---|---|---|
| 11,704,309 B2 * | 7/2023 | Carter | ................. | G06F 16/2453 707/721 |
| 2014/0067867 A1 * | 3/2014 | Pattabhi | ............ | G06F 16/24542 707/E17.055 |

(Continued)

FOREIGN PATENT DOCUMENTS

| | | |
|---|---|---|
| CN | 108664596 A | 10/2018 |
| CN | 109947796 A | 6/2019 |

(Continued)

OTHER PUBLICATIONS

The International Search Report and Written Opinion of the International Searching Authority for International Application No. PCT/CN2022/108511 mailed on Jul. 28, 2022.

*Primary Examiner* — Dangelino N Gortayo
(74) *Attorney, Agent, or Firm* — Womble Bond Dickinson (US) LLP (57) ABSTRACT

Embodiments of this specification provide a table data query method, a table data query apparatus, and a system that are of a distributed database. In response to that a table data processing node executes a first execution subplan to read row data of a driving table, the table data query apparatus generates a data rescanning instruction or a data scanning instruction based on whether a cache apparatus of the table data processing node caches the read row data, and sends the data rescanning instruction or the data scanning instruction to a driven table scanning scheduling apparatus of the table data processing node. The driven table scanning scheduling apparatus obtains a driven table data query result based on (Continued)

the data rescanning instruction or the data scanning instruction, and returns the driven table data query result to the table data query apparatus.

13 Claims, 8 Drawing Sheets

(56) References Cited

U.S. PATENT DOCUMENTS

| | | | |
|---|---|---|---|
| 2015/0286682 A1* | 10/2015 | Ziauddin | G06F 16/24542 |
| | | | 707/718 |
| 2015/0363468 A1* | 12/2015 | Alvey | G06F 16/221 |
| | | | 707/769 |
| 2016/0070726 A1 | 3/2016 | Macnicol et al. | |
| 2016/0085834 A1* | 3/2016 | Gleeson | G06F 16/273 |
| | | | 707/693 |
| 2022/0318263 A1* | 10/2022 | Singh | G06F 16/9024 |

FOREIGN PATENT DOCUMENTS

| | | |
|---|---|---|
| CN | 111506602 A | 8/2020 |
| CN | 113420033 A | 9/2021 |

\* cited by examiner

Distributed database system 100

FIG. 1

```
EXPLAIN
SELECT *
FROM  t1
    LEFT JOIN t2
        ON t1.v1 = t2.v1
        AND t1.v2 = t2.v2
WHERE  t1.v3 = 10;
```

```
|====================================================================
|ID|OPERATOR              |NAME    |EST. ROWS|COST|
--------------------------------------------------------
|0 |NESTED-LOOP OUTER JOIN|        |99       |261 |
|1 | TABLE SCAN           |T1      |10       |40  |
|2 | PX COORDINATOR       |        |99       |158 |
|3 |  EXCHANGE OUT DISTR  |:EX10000|99       |92  |
|4 |   PX PARTITION ITERATOR|      |99       |92  |
|5 |    TABLE SCAN        |T2      |99       |92  |
=====================================================================
```

```
select * from t1 left join t2 on t1.v1 = t2.v1
and t1.v2 = t2.v2 left join t3 on t3.v1 = t2.v1
where t1.v3 = 10;
|===============================================================
|ID|OPERATOR                          |NAME     |EST. ROWS  |COST    |
---------------------------------------------------------------
|0 |NESTED-LOOP OUTER JOIN            |         |384239     |1054765|
|1 | TABLE SCAN                       |T1       |1          |40      |
|2 | PX COORDINATOR                   |         |384239     |805977 |
|3 |  EXCHANGE OUT DISTR              |:EX10001 |384239     |546826 |
|4 |   SUBPLAN SCAN                   |VIEW1    |384239     |546826 |
|5 |    NESTED-LOOP OUTER JOIN        |         |384239     |493793 |
|6 |     EXCHANGE IN DISTR            |         |99         |158     |
|7 |      EXCHANGE OUT DISTR (PKEY)   |:EX10000 |99         |92      |
|8 |       PX PARTITION ITERATOR      |         |99         |92      |
|9 |        TABLE SCAN                |T2       |99         |92      |
|10|     PX PARTITION ITERATOR        |         |3960       |2473    |
|11|      TABLE SCAN                  |T3       |3960       |2473    |
================================================================
```

TABLE DATA QUERY OF DISTRIBUTED DATABASE

CROSS-RELATED APPLICATIONS

This application is a national stage entry of international application no. PCT/CN2022/108511 filed on Jul. 28, 2022, which claims priority to Chinese Application No. 202110943325.3 filed on Aug. 17, 2021, which is herein incorporated by reference in its entirety.

TECHNICAL FIELD

Embodiments of this specification usually relate to the database field, and in particular, to a table data query method, a table data query apparatus, a table data processing node, and a distributed database system that are applied to a distributed database.

BACKGROUND

In some table data processing scenarios of a distributed database, for example, a condition extrapolation scenario of a nested loop join (Nested Loop Join) or subquery execution (Subplan filter), data in a driven table needs to be rescanned (Rescan) for a plurality of times for each row of data in a driving table. When driven tables are distributed in different storage nodes or storage devices, a driven table rescanning process relates to operations such as resource release and a scheduling restart. These operations are usually accompanied by message waiting, synchronization, and a network transmission operation, thereby greatly reducing table data processing efficiency of the distributed database.

SUMMARY

In view of the above-mentioned descriptions, embodiments of this specification provide a table data query method, a table data query apparatus, a table data processing node, and a distributed database system that are applied to a distributed database. According to the table data query method and apparatus, the first table data query result for row data of a driving table is stored in a table data processing node, and the row data is cached in a cache apparatus of the table data processing node; and when it is determined that currently read row data is cached in the cache apparatus, a corresponding table data query result is directly obtained from an intermediate result storage apparatus of the table data processing node, and there is no need to perform a driven table data query in a driven table storage node again, thereby effectively reducing message waiting, synchronization, and a network transmission operation caused in a driven table rescanning process, and improving data processing efficiency.

According to an aspect of the embodiments of this specification, a table data query method applied to a distributed database is provided. The method is performed by a table data query apparatus in a table data processing node, and the table data query method includes: in response to that the table data processing node executes a first execution plan to read row data of a driving table, determining whether a cache apparatus of the table data processing node caches the row data; generating a data rescanning instruction when the cache apparatus caches the row data, where the data rescanning instruction includes a row number of the row data; sending the data rescanning instruction to a driven table scanning scheduling apparatus of the table data processing node, to instruct the driven table scanning scheduling apparatus to read a corresponding driven table data query result from an intermediate result storage apparatus based on the row number of the row data; and obtaining the driven table data query result from the driven table scanning scheduling apparatus.

In an example of the above-mentioned aspect, the table data query method can further include: generating a data scanning instruction when the cache apparatus does not cache the row data, where the data scanning instruction includes the row number of the row data; storing the read row data of the driving table in the cache apparatus; and sending the data scanning instruction to the driven table scanning scheduling apparatus, to instruct the driven table scanning scheduling apparatus to schedule each corresponding driven table storage node to execute a second execution plan to obtain the driven table data query result, where the second execution plan is a distributed execution plan deployed in each driven table storage node, where the driven table data query result of each corresponding driven table storage node is returned to the driven table scanning scheduling apparatus, and is stored, in a correspondence with the row number of the row data, in the intermediate result storage apparatus.

In an example of the above-mentioned aspect, the generating a data scanning instruction when the cache apparatus does not cache the row data can include: determining a condition extrapolation parameter corresponding to the row data when the cache apparatus does not cache the row data; and generating the data scanning instruction based on the condition extrapolation parameter corresponding to the row data, where the data scanning instruction is used to instruct the driven table scanning scheduling apparatus to schedule each corresponding driven table storage node to execute the second execution plan in a case of the condition extrapolation parameter to obtain the driven table data query result.

In an example of the above-mentioned aspect, the table data query method can further include: determining a condition extrapolation parameter corresponding to the row data when the cache apparatus does not cache the row data. The condition extrapolation parameter and the data scanning instruction are delivered together by the driven table scanning scheduling apparatus to the corresponding driven table storage node.

In an example of the above-mentioned aspect, the determining a condition extrapolation parameter corresponding to the row data when the cache apparatus does not cache the row data can include: determining the condition extrapolation parameter corresponding to the row data based on a row value of a join column in the row data when the cache apparatus does not cache the row data.

In an example of the above-mentioned aspect, the first execution plan includes a nested execution plan, and the generating a data rescanning instruction when the cache apparatus caches the row data can include: generating the data rescanning instruction when the cache apparatus caches the row data and the row data is read in response to that the table data processing node executes an innermost execution plan of the nested execution plan.

In an example of the above-mentioned aspect, the first execution plan includes a nested execution plan, and the generating a data scanning instruction when the cache apparatus does not cache the row data can include: generating the data scanning instruction when the cache apparatus does not cache the row data or the row data is not read in response to that the table data processing node executes an innermost execution plan of the nested execution plan.

In an example of the above-mentioned aspect, the innermost execution plan of the nested execution plan is identified by an optimizer in an execution plan compilation phase.

In an example of the above-mentioned aspect, the second execution plan scheduled by the driven table scanning scheduling apparatus includes at least two second distributed execution subplans, and respective processing results of all the second distributed execution subplans are transmitted between the second distributed execution subplans by using the intermediate result storage apparatus.

In an example of the above-mentioned aspect, the table data processing node includes a table join node or a subquery node.

According to another aspect of the embodiments of this specification, a table data query apparatus applied to a distributed database is provided. The table data query apparatus is applied to a table data processing node, and the table data query apparatus includes: a data cache determining unit, configured to: in response to that the table data processing node executes a first execution plan to read row data of a driving table, determine whether a cache apparatus of the table data processing node caches the row data; a scanning instruction generation unit, configured to: generate a data rescanning instruction when the cache apparatus caches the row data, where the data rescanning instruction includes a row number of the row data; a scanning instruction sending unit, configured to send the data rescanning instruction to a driven table scanning scheduling apparatus of the table data processing node, to instruct the driven table scanning scheduling apparatus to read a corresponding driven table data query result from an intermediate result storage apparatus based on the row number of the row data; and a query result obtaining unit, configured to obtain the driven table data query result from the driven table scanning scheduling apparatus.

In an example of the above-mentioned aspect, the scanning instruction generation unit generates a data scanning instruction when the cache apparatus does not cache the row data, where the data scanning instruction includes the row number of the row data; and the scanning instruction sending unit sends the data scanning instruction to the driven table scanning scheduling apparatus, where the data scanning instruction is used to instruct the driven table scanning scheduling apparatus to schedule each corresponding driven table storage node to execute a second execution plan to obtain the driven table data query result, and the second execution plan is a distributed execution plan deployed in each driven table storage node; and The table data query apparatus can further include: a data storage unit, configured to store the read row data of the driving table in the cache apparatus, where the driven table data query result of each corresponding driven table storage node is returned to the driven table scanning scheduling apparatus, and is stored, in a correspondence with the row number of the row data, in the intermediate result storage apparatus.

In an example of the above-mentioned aspect, the scanning instruction generation unit can include: a condition extrapolation parameter determining module, configured to determine a condition extrapolation parameter corresponding to the row data when the cache apparatus does not cache the row data; and a data scanning instruction generation module, configured to generate the data scanning instruction based on the condition extrapolation parameter corresponding to the row data, where the data scanning instruction is used to instruct the driven table scanning scheduling apparatus to schedule each driven table storage node to execute the second execution plan in a case of the condition extrapolation parameter to obtain the driven table data query result.

In an example of the above-mentioned aspect, the table data query apparatus can include: a condition extrapolation parameter determining unit, configured to determine a condition extrapolation parameter corresponding to the row data when the cache apparatus does not cache the row data, where the condition extrapolation parameter and the data scanning instruction are delivered together by the driven table scanning scheduling apparatus to the corresponding driven table storage node.

In an example of the above-mentioned aspect, the condition extrapolation parameter corresponding to the row data is determined based on a row value of a join column in the row data.

In an example of the above-mentioned aspect, the first execution plan includes a nested execution plan, and the scanning instruction generation unit is configured to: generate the data rescanning instruction when the cache apparatus caches the row data and the row data is read in response to that the table data processing node executes an innermost execution plan of the nested execution plan; and generate the data scanning instruction when the cache apparatus does not cache the row data or the row data is not read in response to that the table data processing node executes an innermost execution plan of the nested execution plan.

According to another aspect of the embodiments of this specification, a table data processing node applied to a distributed database, including: a driving table data scanning apparatus, configured to perform scanning to obtain row data of a driving table; the table data query apparatus described above; a cache apparatus, configured to cache the row data that is of the driving table and that is read when the table data processing node executes a first execution plan; a driven table scanning scheduling apparatus, configured to execute a driven table data query based on a data rescanning instruction or a data scanning instruction generated by the table data query apparatus; an intermediate result storage apparatus, configured to store, in correspondence with a row number of the row data, a driven table data query result returned by a driven table storage node; and a table data processing apparatus, configured to perform table data processing based on the row data of the driving table and matched row data of a driven table.

In an example of the above-mentioned aspect, a second execution plan scheduled by the driven table scanning scheduling apparatus includes at least two second distributed execution subplans, and respective processing results of all the second distributed execution subplans are transmitted between the second distributed execution subplans by using the intermediate result storage apparatus.

According to another aspect of the embodiments of this specification, a distributed data system is provided, including: at least one driving table storage node, configured to store row data of a driving table; the table data processing node described above; and at least two driven table storage nodes, where a driven table is stored in some or all of the at least two driven table storage nodes.

According to another aspect of the embodiments of this specification, a table data query apparatus applied to a distributed database is provided, including: at least one processor; a storage coupled to the at least one processor; and a computer program stored in the storage, where the at least one processor executes a computer program to implement the table data query method described above.

According to another aspect of the embodiments of this specification, a computer-readable storage medium is provided. The computer-readable storage medium stores executable instructions, and when the instructions are executed, a processor is enabled to perform the table data query method described above.

According to another aspect of the embodiments of this specification, a computer program product is provided, including a computer program. The computer program is executed by a processor, to implement the table data query method described above.

BRIEF DESCRIPTION OF DRAWINGS

The essence and advantages of the content in this specification can be further understood with reference to the following accompanying drawings. In the accompanying drawings, similar components or features can have the same reference numerals.

DESCRIPTION OF EMBODIMENTS

The subject matter described in this specification is discussed now with reference to example implementations. It should be understood that these implementations are merely discussed to enable a person skilled in the art to better understand and implement the subject matter described in this specification, and are not intended to limit the protection scope, applicability, or examples described in the claims. The functions and arrangements of the elements under discussion can be changed without departing from the protection scope of the content of this specification. Various processes or components can be omitted, replaced, or added in the examples based on needs. For example, the described method can be performed in a sequence different from the described sequence, and steps can be added, omitted, or combined. In addition, features described for some examples can also be combined in other examples.

As used in this specification, the term "include" and variant thereof represent open terms, meaning "including but not limited to". The term "based on" means "at least partially based on". The terms "one embodiment" and "an embodiment" represent "at least one embodiment". The term "another embodiment" means "at least one other embodiment". The terms "first", "second", etc. can refer to different objects or the same object. Other definitions, whether explicit or implicit, can be included below. Unless expressly stated in the context, the definition of one term is consistent throughout this specification.

Figure 1:
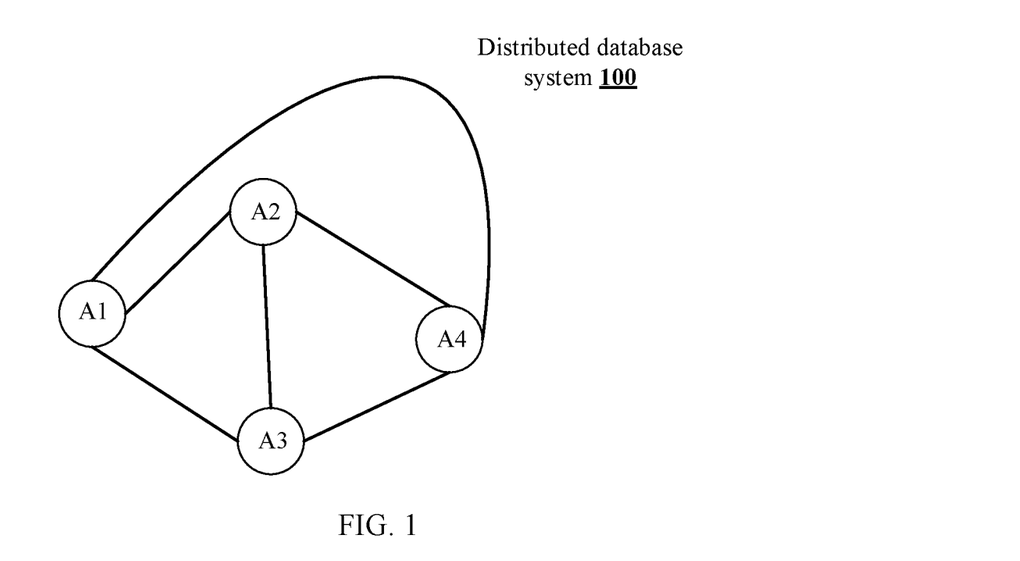
FIG. 1 is an example schematic diagram illustrating a distributed database.

FIG. 1 is an example schematic diagram illustrating a distributed database 100.

As shown in FIG. 1, the distributed database 100 includes four storage nodes A1 to A4, and some or all data tables in the database are distributed in a plurality of different storage nodes. For example, assuming that the database includes four data tables T1 to T4, at least one data table is stored in a plurality of storage nodes in the four storage nodes in a distributed manner. For example, assuming that the database includes two data tables T1 and T2, some data of the data table T1 is stored in the storage node A1, and the remaining data of the data table T1 is stored in the storage node A2. Alternatively, some data of the data table T2 is stored in the storage node A3, and the remaining data of the data table T2 is stored in the storage node A2. Alternatively, the data tables T1 and T2 are stored in a plurality of different storage nodes in a distributed manner.

When the database is used, for example, when a multi-table query is performed on the database, a table join usually needs to be performed on data tables in the database, for example, a table join of the data tables in the database is implemented by using a nested loop join (Nested Loops Join). The term "table join" is combining two data tables into one data set based on an association field. The nested loop join is a table join method in which a join result set is obtained by using a two-layer nested loop when the table join is performed on the data tables. When a table join is performed on a data table A and a data table B, if the data table A is used as a start data table for a table join operation, the data table A is referred to as a driving table, and the data table B is referred to as a driven table. That the data table A is used as a driving table means that when a table join operation is performed, one row of data of the data table A is read, and then row data matching is performed by traversing all row data of the data table B based on read row data of the data table A, thereby implementing the table join.

Figure 2:
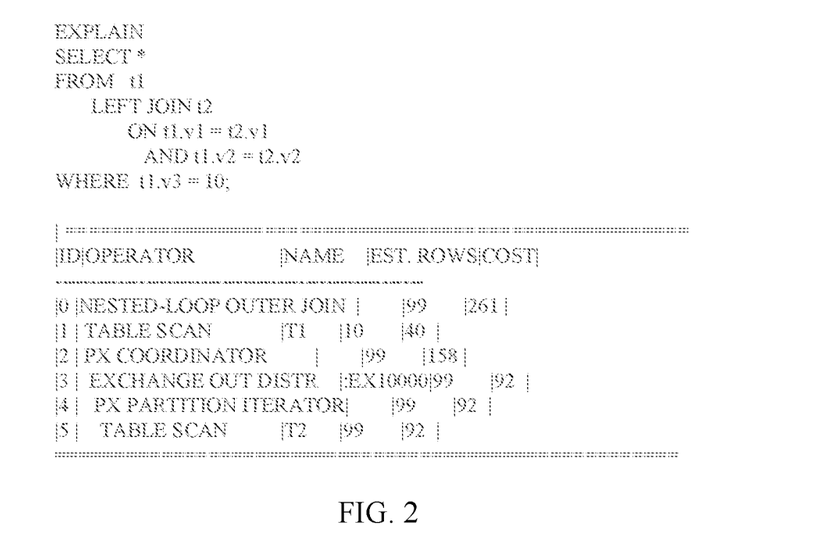
FIG. 2 is an example schematic diagram illustrating an execution plan of a nested loop join process of a distributed database.

FIG. 2 is an example schematic diagram illustrating an execution plan of a nested loop join process of a distributed database.

An upper half part of FIG. 2 shows an SQL query statement, and a lower half part of FIG. 2 shows an execution plan corresponding to the SQL query statement. In an example in FIG. 2, a table T1 is a driving table, a table T2 is a driven table, and for the table T1 and the table T2, a left outer join is performed based on values of join columns V1 and V2. A distributed execution plan corresponding to the SQL query statement includes six execution plans, that is, NESTED-LOOP OUTER JOIN (execution plan 0), TABLE SCAN T1 (execution plan 1), PX COORDINATOR (execution plan 2), EXCHANGE OUT DISTR (execution plan 3), PX PARTITION ITERATOR (execution plan 4), and TABLE SCAN T2 (execution plan 5). The execution plan 0 and the execution plan 2 are deployed in a table join node, the execution plan 1 is deployed in a driving table storage node, and the execution plan 3 to the execution plan 5 are deployed in a distributed driven table storage node. Here, the execution plan 0 and the execution plan 2 are equivalent to a first execution plan in this specification, and the execution plan 3 to the execution plan 5 are equivalent to a second execution plan in this specification.

Specifically, for the values V1 and V2 in each row of data in the table T1, full table scanning is performed on the table T2 to search for row data with equal values V1 and V2 for a table join. During the table join, for each row of data in the table T1, the above-mentioned scanning process needs to be repeated for the table T2. When the table T1 and the table T2 are stored in the same storage node, a rescanning process can be completed by using only a simple memory/IO operation, so that the above-mentioned execution plans have relatively good execution performance.

However, when the table T1 and the table T2 are not stored in the same storage node, and the table T2 is stored in a plurality of different storage nodes in a distributed manner, distributed related costs such as resource release, a scheduling restart, and network transmission are introduced when the rescanning process is executed for the table T2. Consequently, execution performance of the execution plans are poor.

Figure 3:
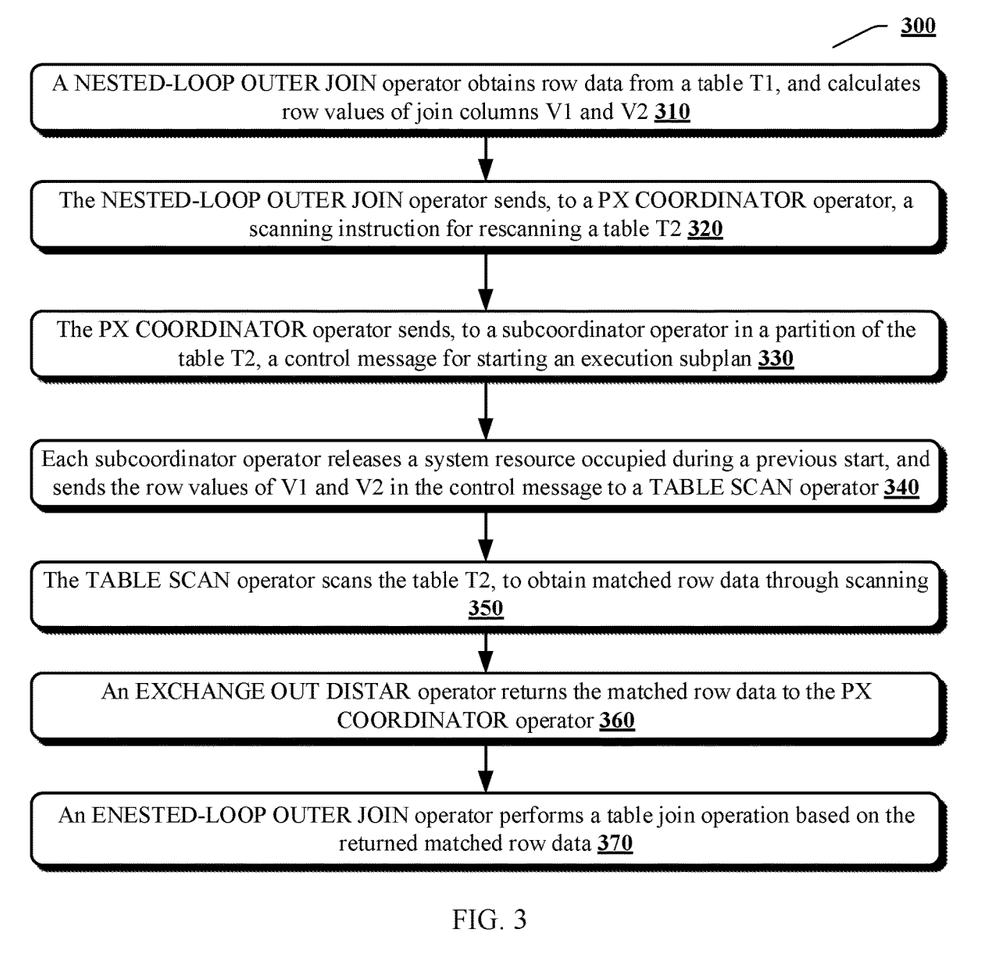
FIG. 3 is an example schematic diagram illustrating an implementation of a nested loop join process of a distributed database.

FIG. 3 is an example schematic diagram illustrating an implementation of a nested loop join process 300 of a distributed database. In an example shown in FIG. 3, a driving table (table T1) and a driven table (table T2) are not stored in the same storage node, and the table T2 is stored in a plurality of different storage nodes in a distributed manner.

As shown in FIG. 3, in 310, a NESTED-LOOP OUTER JOIN operator obtains row data from the table T1, and calculates row values of join columns V1 and V2 in the row data.

In 320, the NESTED-LOOP OUTER JOIN operator sends, to a PX COORDINATOR operator (also referred to as a coordinator node), a rescanning instruction for rescanning the table T2.

The PX COORDINATOR operator restarts execution of execution plans 2 to 5 in response to receiving the rescanning instruction. Specifically, in 330, the PX COORDINATOR operator sends an execution plan start control message to subcoordinator nodes in all partitions of the table T2 that are located in each driven table storage node. The control message sent by the PX COORDINATOR operator includes parameter values of join columns V1 and V2 of a current row data of the table T1.

In 340, each subcoordinator node releases a system resource occupied during a previous subplan start, and sends, to a TABLE SCAN operator in each driven table storage node, the parameter values that are of the join columns V1 and V2 of the current row data of the table T1 and that are included in the control message.

In 350, the TABLE SCAN operator in each driven table storage node scans the table T2, to obtain matched row data.
In 360, an EXCHANGE OUT DISTR operator in each driven table storage node returns the matched row data to the PX COORDINATOR operator.
In 370, the NESTED-LOOP OUTER JOIN operator obtains the matched row data from the PX COORDINATOR operator, and performs a table join operation by using the obtained row data of the table T1 and the obtained matched row data of the table T2.

The above-mentioned procedure is repeated, until a table join operation is completed for all row data of the table T1.

In the above-mentioned nested loop join process, an operation of the EXCHANGE OUT DISTR operator (that is, a subplan 3) greatly affects execution performance of an execution plan. The operation of the EXCHANGE OUT DISTR operator relates to distributed interaction between a coordinator node and a subcoordinator node, and a scheduling restart of the coordinator node. The distributed interaction includes a control message for releasing a previous execution resource of the subcoordinator node, a control message for scheduling the subcoordinator node, etc. RPC interaction of these several control messages leads to additional overheads. In addition, a subplan scheduling relationship needs to be re-established for the scheduling restart of the coordinator node. Such a re-establishment process leads to scheduling overheads.

According to the above-mentioned execution plan processing procedure, the operation of the EXCHANGE OUT DISTR operator is performed again each time the Nested Loop Join operator reads one row of data of the driving table, resulting in increasing accumulated overheads of distributed interaction and the scheduling restart, and greatly affecting execution performance of an execution plan.

In view of the above-mentioned descriptions, an embodiment of this specification provides a table data query solution applied to a distributed database. In the table data query solution, the first table data query result for row data of a driving table is stored in an intermediate result storage apparatus of a table data processing node, and the row data is cached in a cache apparatus of the table data processing node. Each time after the table data processing node reads the row data of the driving table, the table data processing node determines whether currently read row data is cached in the cache apparatus. When the currently read row data is cached in the cache apparatus, a corresponding table data query result is directly obtained from the intermediate result storage apparatus of the table data processing node, and there is no need to perform a driven table data query in a driven table storage node again, thereby effectively reducing message waiting, synchronization, and a network transmission operation caused in a driven table rescanning process, and improving data processing efficiency.

The following describes in detail a table data query method, a table data query apparatus, a table data processing node, and a distributed database system that are applied to a distributed database in the embodiments of this specification with reference to the accompanying drawings.

Figure 4:
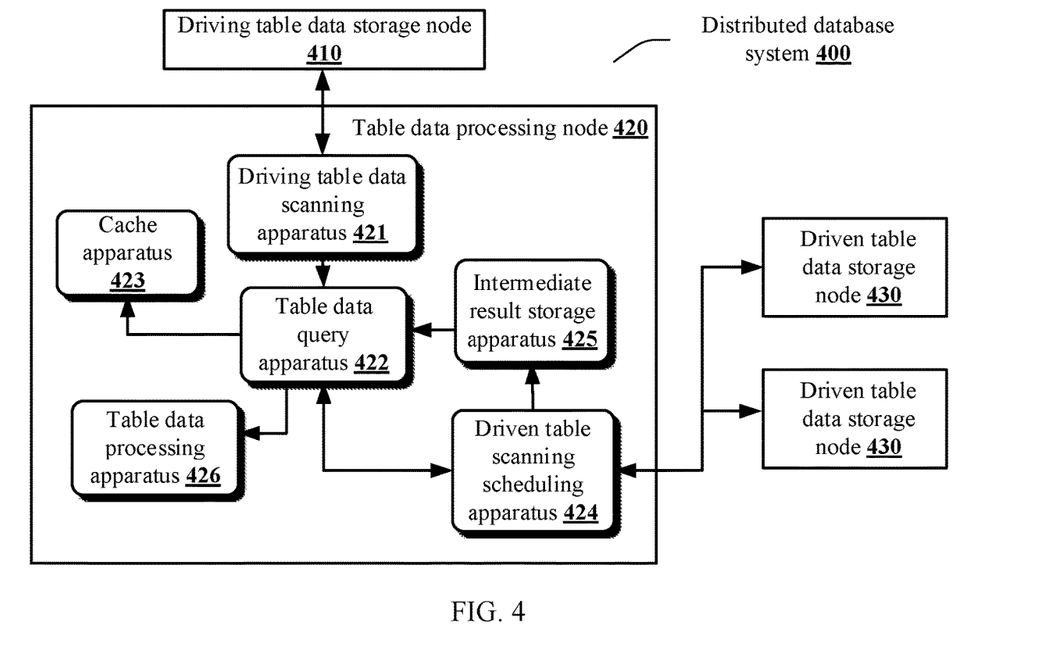
FIG. 4 is an example schematic diagram illustrating a distributed database system, according to an embodiment of this specification.

FIG. 4 is an example schematic diagram illustrating a distributed database system 400, according to an embodiment of this specification.

As shown in FIG. 4, the distributed database system 400 includes a driving table data storage node 410, a table data processing node 420, and at least two driven table storage nodes 430. The driving table data node 410 stores row data of a driving table. The row data of the driven table is stored in each of the at least two driven table storage nodes 430 in a distributed manner. The table data processing node 420 is configured to perform a processing operation for table data, for example, nested loop join processing (Nested Loop Join) or subquery processing (Subplan Filter). Correspondingly, the table data processing node 420 can also serve as a table join node or a subquery node. In this specification, the term "node" can be used interchangeably with the term "device" and "apparatus".

In addition, in some embodiments, the driving table data storage node 410 can include two or more driving table data storage nodes. Row data of each driving table is stored in a plurality of different driving table data storage nodes in a distributed manner. Similarly, the table data processing node 420 can also include two or more table data processing nodes.

The table data processing node 420 is configured to perform table data processing by using driving table data and driven table data. As shown in FIG. 4, the table data processing node 420 includes a driving table data scanning apparatus 421, a table data query apparatus 422, a cache apparatus 423, a driven table scanning scheduling apparatus 424, an intermediate result storage apparatus 425, and a table data processing apparatus 426.

The driving table data scanning apparatus 421 is configured to perform scanning to obtain the row data of the driving table. For example, the driving table data scanning apparatus 421 can execute a first execution plan by using the table data processing node, to schedule execution of an execution plan (for example, TABLE SCAN T1 in FIG. 2) deployed in the driving table storage node, so as to perform scanning to obtain the row data of the driving table.

The table data query apparatus 422 is configured to determine a scanning policy of driven table data based on the obtained row data of the driving table, that is, determine a scanning policy for a driven table, and obtain, from the driven table scanning scheduling apparatus, a driven table data query result obtained based on the determined scanning policy. The scanning policy includes a data rescanning policy (a data rescanning instruction) and a data scanning policy (a data scanning instruction, that is, a normal data scanning policy). A specific operation process and structure of the table data query apparatus 422 are described in detail below with reference to the accompanying drawings.

The cache apparatus 423 is configured to cache the row data that is of the driving table and that is read when the table data processing node executes the first execution plan; The cache apparatus 423 can be implemented by using any volatile memory or volatile storage apparatus in the art. Examples of the volatile memory can include but are not limited to a dynamic random access memory (DRAM) and a static random access memory (SRAM). Examples of the DRAM can include but are not limited to an SDRAM, a DDR SDRAM, a DDRII SDRAM, etc.

The driven table scanning scheduling apparatus 424 is configured to execute a driven table data query based on the data rescanning instruction or the data scanning instruction generated by the table data query apparatus 422. When receiving the data rescanning instruction, the driven table scanning scheduling apparatus 424 obtains a corresponding driven table data query result from the intermediate result storage apparatus 425 based on a row number of the read row data of the driving table. When receiving the data scanning instruction, the driven table scanning scheduling apparatus 424 schedules each corresponding driven table storage node to execute a second execution plan to obtain a driven table data query result. The driven table scanning scheduling apparatus 424 is equivalent to the PX COORDINATOR operator in FIG. 2 and PX in FIG. 8.

The intermediate result storage apparatus 425 is configured to store, in correspondence with the row number of the read row data of the driving table, the driven table data query result returned by the driven table storage node. The intermediate result storage apparatus 425 can be implemented by using any volatile memory or volatile storage apparatus in the art. Examples of the nonvolatile memory can include but are not limited to a ROM, a FLASH, an optical disc, a floppy disk, a hard disk, etc.

In this embodiment of this specification, an intermediate result of the driving table data query can be first written into a cache. If the cache is insufficient or data is not read for more than 10 seconds, a background thread is responsible for writing the nonvolatile memory. Because a temporary intermediate result is stored, the temporary intermediate result cannot be restored at a database level after power is off. The intermediate result only written into the cache cannot be restored after power is off. An intermediate result written into the nonvolatile memory can still be restored from the storage after power is off.

The table data processing apparatus 426 is configured to perform table data processing based on the read row data of the driving table and the found matched row data of the driven table. The table data processing can include, for example, table join processing or table subquery processing.

Figure 5:
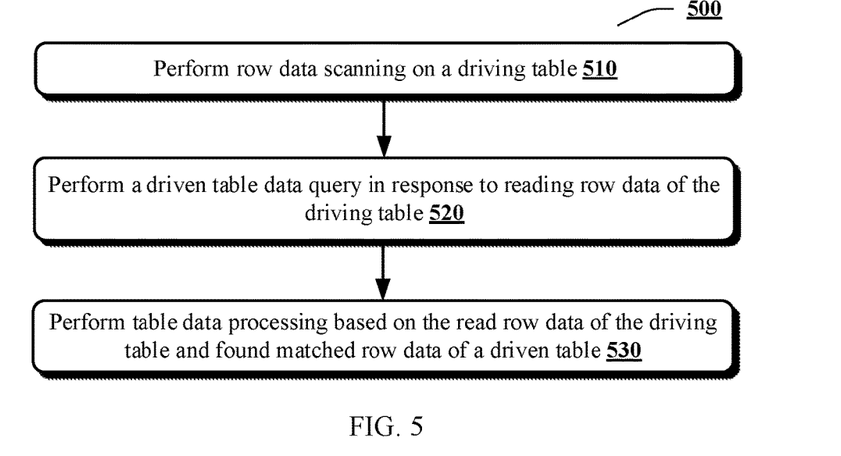
FIG. 5 is an example flowchart illustrating a table data processing method applied to a distributed database, according to an embodiment of this specification.

FIG. 5 is an example flowchart illustrating a table data processing method 500 applied to a distributed database, according to an embodiment of this specification. As shown in FIG. 5, in 510, a table data processing node performs row data scanning on a driving table, to obtain row data of the driving table. For example, the table data processing node executes a first execution plan to schedule execution of an execution subplan that is deployed in a driving table storage node and that is used for data scanning to obtain the row data of the driving table. In an example, one row of data can be obtained during each time of row data scanning. In another example, batch row data can be obtained during each time of row data scanning. A quantity of rows of the batch row data obtained each time can be determined in advance.

In 520, in response to reading the row data of the driving table, the table data processing node performs a table data query on a driven table based on the read row data of the driving table, to obtain matched row data.

In 530, the table data processing node performs table data processing based on the read row data of the driving table and the found matched row data of the driven table.

Figure 6:
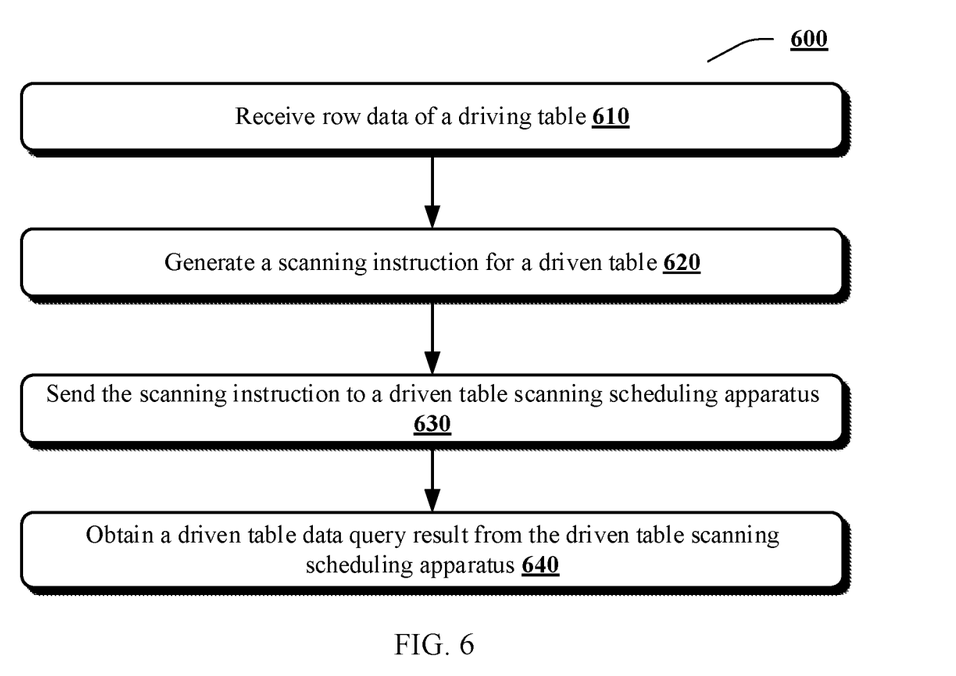
FIG. 6 is an example flowchart illustrating a table data query method applied to a distributed database, according to an embodiment of this specification.

FIG. 6 is an example flowchart illustrating a table data query method applied to a distributed database, according to an embodiment of this specification. The table data query method in FIG. 6 is performed by a table data query apparatus, to obtain matched row data of a driven table. As shown in FIG. 6, in 610, row data that is of a driving table and that is read when a table data processing node executes a first execution plan is received. In an example, the read row data can be one row of data. In another example, the read row data can be batch row data.

In 620, a scanning instruction for the driven table is generated based on the received row data of the driving table.

Figure 7:
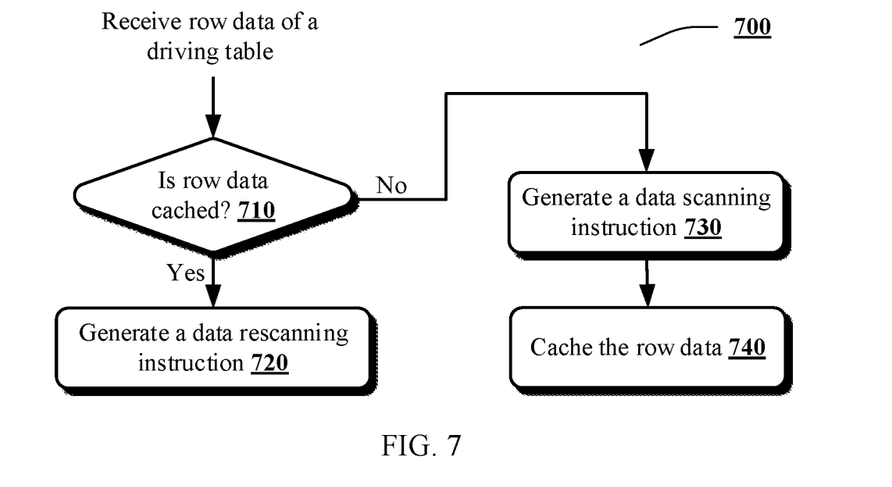
FIG. 7 is an example flowchart illustrating a scanning instruction generation process, according to an embodiment of this specification.

FIG. 7 is an example flowchart illustrating a scanning instruction generation process 700, according to an embodiment of this specification. As shown in FIG. 7, after the read row data of the driving table is received, in 710, whether a cache apparatus of the table data processing node caches the row data is determined.

If it is determined that the cache apparatus caches the row data, in 720, a data rescanning instruction is generated. The generated data rescanning instruction includes a row number of the row data, and is used to instruct a driven table data scanning apparatus to read a corresponding driven table data query result from an intermediate result storage apparatus based on the row number of the row data.

If it is determined that the cache apparatus does not cache the row data, in 730, a data scanning instruction is generated. The generated data scanning instruction includes the row number of the row of data. Here, the data scanning instruction is a normal scanning instruction, and is used to instruct the driven table data scanning apparatus to schedule each corresponding distributed driven table storage node to execute a second execution plan to implement data scanning for a driven table, so as to obtain a driven table data query result, that is, read the row data from the driven table. In 740, the read row data is cached in the cache apparatus.

When the read row data of the driving table is batch row data, the data rescanning instruction can also be referred to as a batch rescanning instruction, and the data scanning instruction can also be referred to as a batch scanning instruction.

Figure 8:
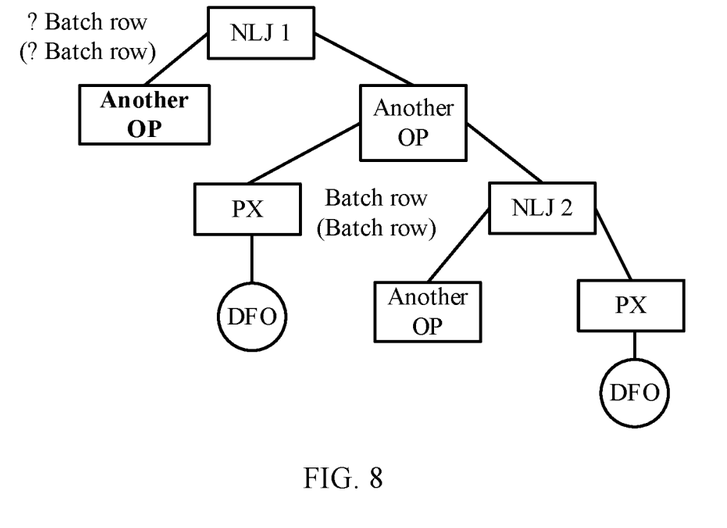
FIG. 8 is an example schematic diagram illustrating a nested execution plan, according to an embodiment of this specification.

In some embodiments, the first execution plan executed by the table data processing node can be a nested execution plan. FIG. 8 is an example schematic diagram illustrating a nested execution plan, according to an embodiment of this specification. In an example in FIG. 8, two nested loop joins (NLJ) form a distributed execution plan in a nested manner. Here, an NLJ 1 is an outer layer NLJ, and an NLJ 2 is an inner layer NLJ. In this case, if data scanning of the driven table is performed in a condition extrapolation manner, a quantity of transmitted dynamic parameters increases by multiple. For example, if the two NLJs are nested, when a parameter quantity of the outer layer NLJ is M and a parameter quantity of the inner layer NLJ is N, M*N parameter combinations are generated. If a plurality of NLJs are nested, a size of a parameter set generated after amplification is performed based on a plurality of parameter quantities is very large. To reduce a scale of the transmitted dynamic parameters, a nested execution plan needs to be identified when an optimizer performs execution plan compilation, and an innermost layer NLJ is identified. When data scanning is performed on the driven table, the abovementioned data rescanning process is started only for the row data that is of the driving table and that is read by the innermost layer NLJ, to reduce a quantity of transmitted dynamic parameters.

Figure 9:
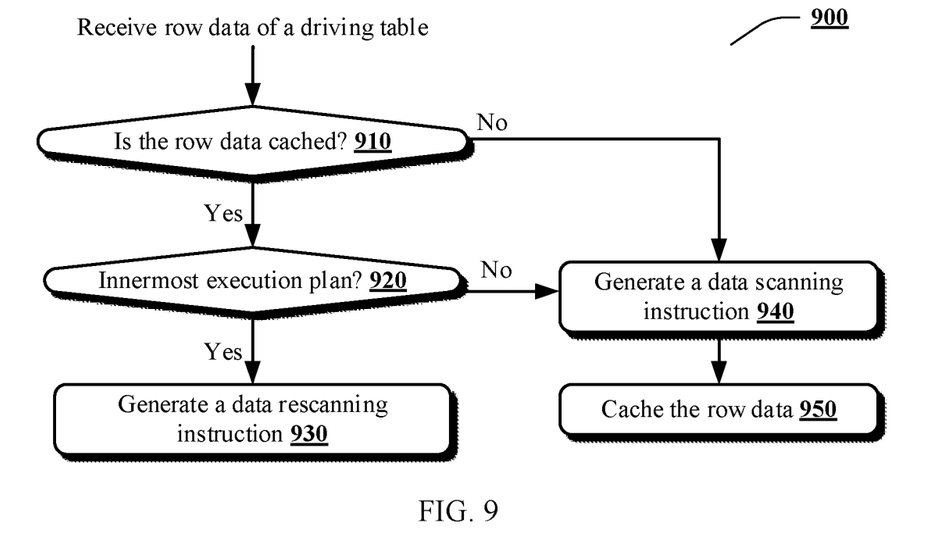
FIG. 9 is another example flowchart illustrating a scanning instruction generation process, according to an embodiment of this specification.

FIG. 9 is another example flowchart illustrating a scanning instruction generation process 900, according to an embodiment of this specification. As shown in FIG. 9, after the read row data of the driving table is received, in 910, whether a cache apparatus of the table data processing node caches the row data is determined.

If it is determined that the cache apparatus caches the row data, in 920, whether the row data is read in response to that the table data processing node executes an innermost execution plan of the nested execution plan is determined. For example, whether the row data is read in response to that the table data processing node executes the innermost execution plan of the nested execution plan can be determined based on an internal identifier identified when the optimizer performs execution plan compilation.

If it is determined that the row data is read in response to that the table data processing node executes the innermost execution plan of the nested execution plan, in 930, the data rescanning instruction is generated.

If it is determined that the cache apparatus does not cache the row data, or the row data is not read in response to that the table data processing node executes the innermost execution plan of the nested execution plan, in 940, the data scanning instruction is generated, to instruct the driven table data scanning apparatus to schedule each corresponding distributed driven table storage node to execute the second execution plan to read the row data.

In 950, the read row data is cached in the cache apparatus.

In a solution shown in FIG. 9, in an execution plan compilation phase of the optimizer, a lower-most NLJ (NLJ 2) in FIG. 8 is identified as the innermost execution plan. Therefore, when data scanning is performed for the driven table, data rescanning is performed only on row data obtained by the NLJ 2, so that lower-most PX obtains only a dynamic parameter set from the NLJ 2. In this case, a quantity of scheduling restart times is M*N/Batch size.

Back to FIG. 6, after the data rescanning instruction or the data scanning instruction is generated as described above, in 630, the data rescanning instruction or the data scanning instruction is sent to the driven table scanning scheduling apparatus. The driven table scanning scheduling apparatus obtains the matched row data of the driven table based on the data rescanning instruction or the data scanning instruction.

When a received scanning instruction is a data rescanning instruction, the driven table scanning scheduling apparatus reads a corresponding driven table data query result from the intermediate result storage apparatus based on the row number of the row data in the data rescanning instruction. When the received scanning instruction is the data scanning instruction, the driven table scanning scheduling apparatus schedules a corresponding driven table storage node to execute a second execution plan to implement data scanning for the driven table, to obtain a driven table data query result. The driven table data query result of the driven table storage node is returned to the driven table data scanning apparatus. In addition, the driven table data query result returned by the driven table storage node is stored, in a correspondence with the row number of the read row data of the driving table, in the intermediate result storage apparatus.

In 640, the table data query apparatus obtains the driven table data query result from the driven table data scanning apparatus.

In addition, when a data query for the driven table relates to condition extrapolation, if the cache apparatus does not cache the row data, a condition extrapolation parameter corresponding to the read row data can be further determined. Then, the data scanning instruction is generated based on the condition extrapolation parameter corresponding to the read row data. In other words, the data scanning instruction sent to the driven table scanning apparatus includes the condition extrapolation parameter, so that each driven table storage node can perform driven table data scanning in a case of a received condition extrapolation parameter set. In some embodiments, the determined condition extrapolation parameter can be stored in a parameter storage apparatus of the table data processing node. Therefore, when the driven table scanning scheduling apparatus schedules each driven table storage node to execute an execution plan of the driven table storage node, the driven table scanning scheduling apparatus obtains the condition extrapolation parameter from the parameter storage apparatus, and sends the obtained condition extrapolation parameter to the corresponding driven table storage node together with the data scanning instruction.

In addition, when the read row data is batch row data, the determined condition extrapolation parameter is a condition extrapolation parameter set. When each driven table storage node performs driving table data scanning in a case of the received condition extrapolation parameter set, each row of data in the driving table corresponds to a group of parameters, and a data query result is generated. If the batch row data includes N rows of data, N data query results are generated.

In addition, in some distributed execution plans, the second execution plan scheduled by the driven table scanning scheduling apparatus includes at least two second distributed execution plans deployed in at least two driven table storage nodes. Optionally, respective processing results of all the second distributed execution subplans are transmitted between the second distributed execution subplans by using the intermediate result storage apparatus.

Figure 10:
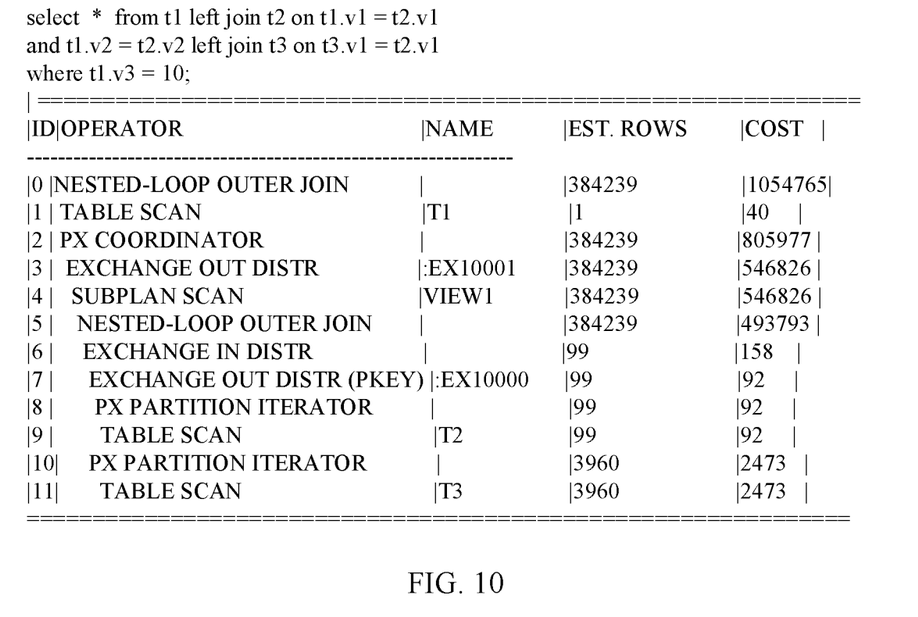
FIG. 10 is another example schematic diagram illustrating an execution plan of a nested loop join process of a distributed database.

FIG. 10 is another example schematic diagram illustrating an execution plan of a nested loop join process of a distributed database.

In the execution plan shown in FIG. 10, DFO division is performed by using an EXCHANGE OUT operator as a boundary. After DFO division is performed, operators 3, 4, 5, 6, 10, and 11 become a DFO 1, and operators 7, 8, and 9 become the same DFO 0. After DFO division is completed, a PX operator sequentially schedules the DFO from the bottom to the top for execution, to determine servers on which each DFO needs to be performed. A scheduling command is sent on the servers, to start SQL to start execution. In the above-mentioned example, the PX operator schedules the DFO 0, and then schedules the DFO 1.

In execution of the DFO 0, there is a batch of groups of condition extrapolation parameter. Entire execution processes of 7, 8, and 9 are completed for each group of condition extrapolation parameters, to generate an intermediate result for use in next execution of the DFO 1. After an execution plan is completed for each group of parameters, a next group of parameters need to be switched on a current server, and all memory states need to be reset to execute local rescanning again. Therefore, after the batch of groups of parameters are all executed, a batch of data query results are generated, and the data query results are stored in the intermediate result storage apparatus. When the DFO 1 is executed, a batch of intermediate results are read from intermediate results. After an intermediate result is read, the entire DFO 1 is executed. When the next intermediate result is read, all memory states are reset and the entire DFO 1 is executed again. Such loop processing is performed, until all the intermediate results are read, thereby completing execution of all the DFOs and obtaining a final data query result. The obtained data query result is returned to the PX operator for subsequent use.

Figure 11A:
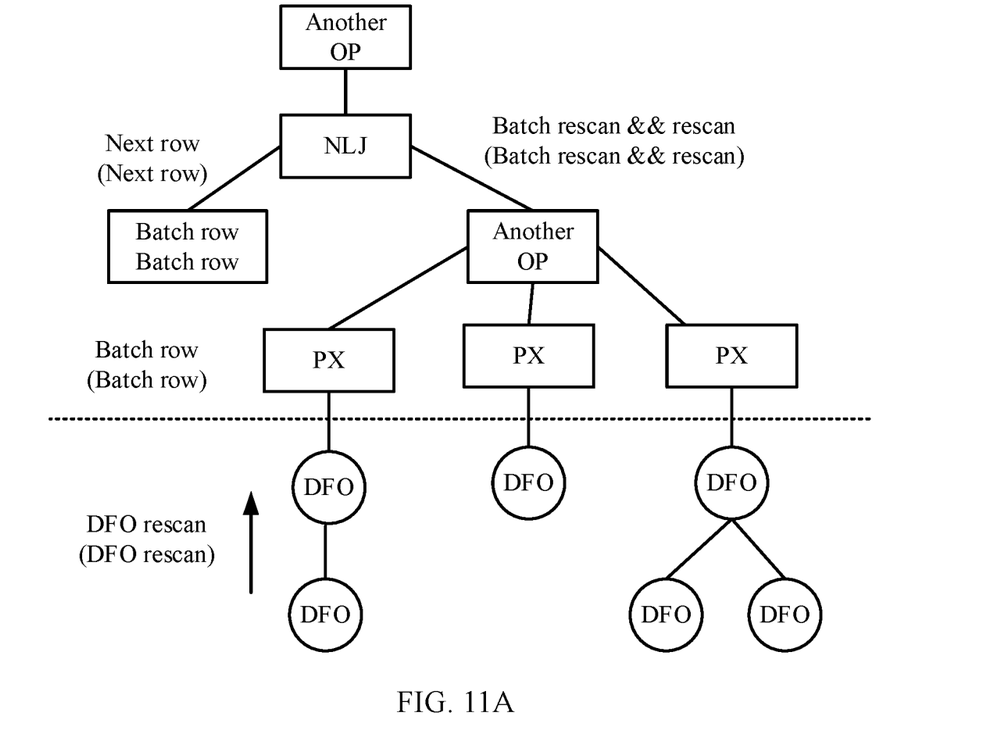
FIG. 11A to FIG. 11C each show an example application scenario of a table data query method, according to an embodiment of this specification.
Figure 11B:
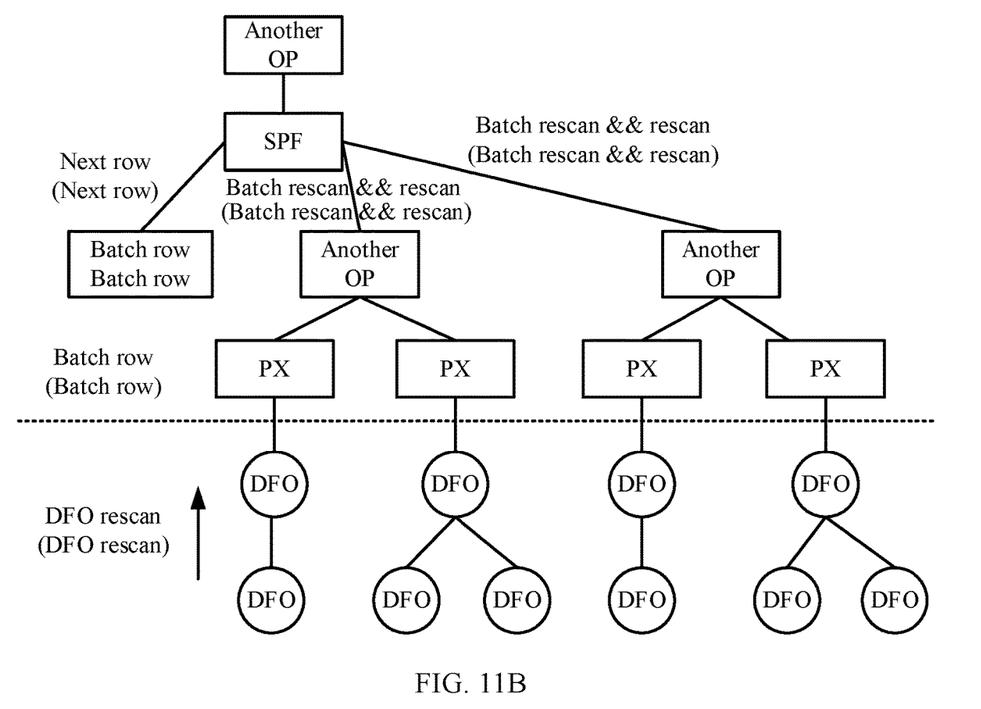
Figure 11C:
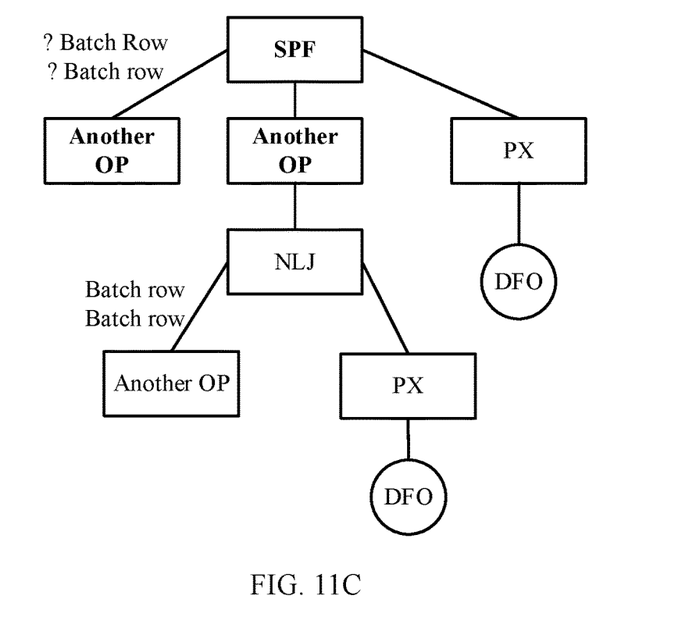

FIG. 11A to FIG. 11C each show an example application scenario of a table data query method, according to an embodiment of this specification.

FIG. 11A shows an application scenario of nested loop table join processing. In the application scenario, only a single nested loop join node (NLJ) is included. Optionally, the table data query method in this embodiment of this specification can also be applied to nested loop table join processing with the nested NLJ structure shown in FIG. 8.

FIG. 11B shows an application scenario of distributed data rescanning of condition extrapolation of a subplan filter. In the application scenario, a driving table still exists on the left side, and a plurality of distributed subplans exist on the right side. In this application scenario, after the subplan filter operator obtains batch row data from the left side, and calculates a dynamic parameter (condition extrapolation parameter), the subplan filter operator needs to sequentially perform rescanning on the driven subplan on the right side. Each execution procedure is the same as a processing procedure of a single NLJ scenario shown in FIG. 11A.

FIG. 11C shows an application scenario in which a subplan filter and a nested loop join are superposed. In this application scenario, both the nested loop join and the subplan filter can enable distributed data rescanning.

As shown in FIG. 11C, there are two distributed subplans on the right side of the subplan filter. For a subplan on an intermediate side, because nested loop joins are nested, a lower-most PX operator and a top layer subplan filter do not form a related relationship of data rescanning, but only forms a dependency relationship with an inner layer nested loop join. However, a rightmost branch of distribution subplan can form a data rescanning relationship with the top layer subplan filter. Therefore, in the execution plan, both the subplan filter and the nested loop join can enable distributed data rescanning. For each branch, a quantity of scheduling restarts is reduced to original 1/Batch size through batch rescanning, thereby improving execution performance.

In addition, the table data query solution in this embodiment of this specification can also be applied to the application scenario in which the subplan filter and the subplan filter operator are nested and superposed. The application scenario is similar to nesting and superposition of nested loop joins, and distributed data rescanning is only enabled for the inner layer subplan filter.

Figure 12:
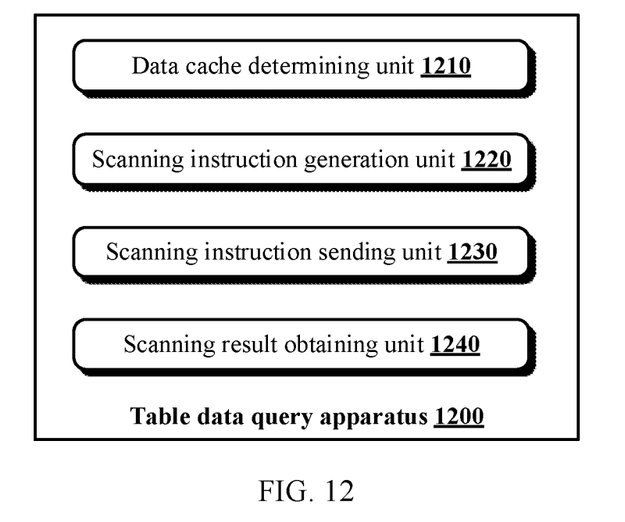
FIG. 12 is an example block diagram illustrating a table data query apparatus applied to a distributed database, according to an embodiment of this specification.

FIG. 12 is an example block diagram illustrating a table data query apparatus 1200 applied to a distributed database, according to an embodiment of this specification. As shown in FIG. 12, the table data query apparatus 1200 includes a data cache determining unit 1210, a scanning instruction generation unit 1220, a scanning instruction sending unit 1230, and a scanning result obtaining unit 1240.

The data cache determining unit 1210 is configured to: in response to that a table data processing node executes a first execution plan to read row data of a driving table, determine whether a cache apparatus of the table data processing node caches read row data of a driving table.

When the scanning instruction generation unit 1220 is configured to generate a data rescanning instruction when the cache apparatus caches the read row data of the driving table. The data rescanning instruction includes a row number of the read row data of the driving table.

The scanning instruction sending unit 1230 is configured to send the generated data rescanning instruction to a driven table scanning scheduling apparatus of the table data processing node, to instruct the driven table scanning scheduling apparatus to read a corresponding driven table data query result from an intermediate result storage apparatus based on the row number of the row data in the data rescanning instruction.

The query result obtaining unit 1240 is configured to obtain the driven table data query result from the driven table scanning scheduling apparatus.

In addition, the scanning instruction generation unit 1220 generates a data scanning instruction when the cache apparatus does not cache the read row data. The data scanning instruction includes the row number of the read row data. The scanning instruction sending unit 1230 sends the data scanning instruction to the driven table scanning scheduling apparatus, to instruct the driven table scanning scheduling apparatus to schedule a corresponding driven table storage node to execute a second execution plan to implement driven table data scanning, to obtain the driven table data query result. In this case, the table data query apparatus 1200 can further include a data storage unit (not shown). The data storage unit is configured to store the read row data of the driving table in the cache apparatus. In addition, the driven table data query result of the driven table storage node is returned to the driven table scanning scheduling apparatus, and is stored, in a correspondence with the row number of the read row data of the driving table, in the intermediate result storage apparatus.

In some embodiments, the read row data of the driving table can include batch row data. Correspondingly, the data rescanning instruction can be referred to as a batch rescanning instruction, and the data scanning instruction can be referred to as a batch scanning instruction.

In some embodiments, the scanning instruction generation unit 1220 can include a condition extrapolation parameter determining module and a data scanning instruction generation module. The condition extrapolation parameter determining module is configured to determine a condition extrapolation parameter corresponding to the row data when the cache apparatus does not cache the read row data of the driving table. The data scanning instruction generation module is configured to generate the data scanning instruction based on the condition extrapolation parameter corresponding to the row data. The generated data scanning instruction is used to instruct the driven table scanning scheduling apparatus to schedule the corresponding driven table storage node to execute the driven table data scanning in a case of the condition extrapolation parameter. When the read row data of the driving table includes batch row data, a set of condition extrapolation parameters are determined for each piece of row data, to obtain a corresponding condition extrapolation parameter set.

In some embodiments, the condition extrapolation parameter determining module can be configured to determine the condition extrapolation parameter corresponding to the row data based on a row value of a join column of the row data when the cache apparatus does not cache data. When the read row data of the driving table includes batch row data, the condition extrapolation parameter determining module can be configured to determine a condition extrapolation parameter corresponding to each piece of row data based on a row value of a join column of the piece of row data.

In some embodiments, the first execution plan executed by the table data processing node can include a nested execution plan. The scanning instruction generation unit 1220 generates the data rescanning instruction when the cache apparatus caches the read row data and the row data is read in response to that the table data processing node executes an innermost execution plan of the nested execution plan. The scanning instruction generation unit 1220 generates the data scanning instruction when the cache apparatus does not cache the read row data or the read row data is not read in response to that the table data processing node executes an innermost execution plan of the nested execution plan.

The table data query method and the table data query apparatus in the embodiments of this specification are described above with reference to FIG. 1 to FIG. 12. The table data query apparatus can be implemented by using hardware, or can be implemented by using software or a combination of hardware and software.

Figure 13:
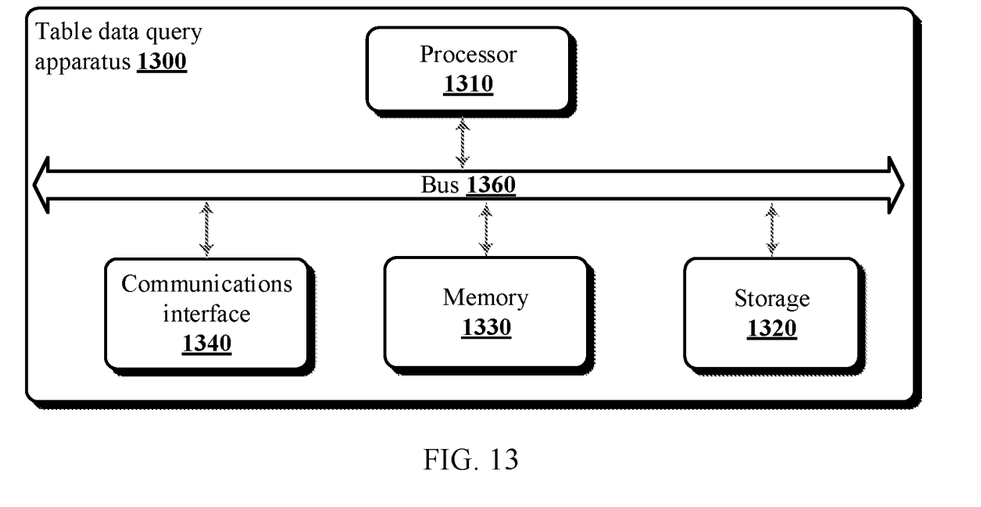
FIG. 13 is an example schematic diagram illustrating a table data query apparatus that is applied to a distributed database and that is implemented based on a computer system, according to an embodiment of this specification.

FIG. 13 is a schematic diagram illustrating a table data query apparatus 1300 that is applied to a distributed database and that is implemented based on a computer system, according to an embodiment of this specification. As shown in FIG. 13, the table data query apparatus 1300 can include at least one processor 1310, a storage (for example, a nonvolatile memory) 1320, a memory 1330, and a communication interface 1340, and the at least one processor 1310, the storage 1320, the internal storage 1330, and the communication interface 1340 are connected together by using a bus 1360. At least one processor 1310 executes at least one computer-readable instruction (that is, the above-mentioned elements implemented in a software form) stored or encoded in the storage.

In an embodiment, the storage stores computer-executable instructions, and when the computer-executable instructions are executed, the at least one processor 1310 is enabled to perform the following operations: in response to that a table data processing node executes a first execution plan to read row data of a driving table, determining whether a cache apparatus of the table data processing node caches the row data; generating a data rescanning instruction when the cache apparatus caches the read row data, where the data rescanning instruction includes a row number of the read row data; sending the data rescanning instruction to a driven table scanning scheduling apparatus of the table data processing node, to instruct the driven table scanning scheduling apparatus to read a corresponding driven table data query result from an intermediate result storage apparatus based on the row number of the row data; and obtaining the driven table data query result from the driven table scanning scheduling apparatus.

It should be understood that, when the computer-executable instructions stored in the storage are executed, the at least one processor 1310 is enabled to perform the above-mentioned operations and functions described with reference to FIG. 1 to FIG. 12 in the embodiments of this specification.

According to an embodiment, a program product such as a machine-readable medium (for example, a non-temporary machine-readable medium) is provided. The machine-readable medium can have instructions (that is, the above-mentioned elements implemented in a software form). When the instructions are executed by a machine, the machine is enabled to perform the above-mentioned operations and functions described with reference to FIG. 1 to FIG. 12 in the embodiments of this specification. Specifically, a system or an apparatus provided with a readable storage medium can be provided, and software program code for implementing the functions in any of the above-mentioned embodiments is stored in the readable storage medium, so that a computer or a processor of the system or the apparatus reads and executes instructions stored in the readable storage medium.

In this case, the program code read from the readable medium can implement the functions in any one of the above-mentioned embodiments, and therefore, the machine-readable code and the readable storage medium storing the machine-readable code form a part of this disclosure.

Embodiments of the readable storage medium include a floppy disk, a hard disk, a magneto-optical disk, an optical disc (for example, a CD-ROM, a CD-R, a CD-RW, a DVD-ROM, a DVD-RAM, a DVD-RW, a DVD-RW), a magnetic tape, a nonvolatile memory card, and a ROM. Alternatively, the program code can be downloaded from a server computer or a cloud by a communication network.

According to an embodiment, a computer program product is provided. The computer program product includes a computer program, and when the computer program is executed by a processor, the processor is enabled to perform the above-mentioned operations and functions described with reference to FIG. 1 to FIG. 12 in the embodiments of this specification.

A person skilled in the art should understand that various variations and modifications can be made to the embodiments disclosed above without departing from the essence of the present invention. Therefore, the protection scope of this disclosure shall be subject to the appended claims.

It is worthwhile to note that, not all steps and units in the previous processes and system structure diagrams are necessary. Some steps or units can be ignored based on actual requirements. An execution sequence of each step is not fixed, and can be determined based on needs. The apparatus structure described in the above-mentioned embodiments can be a physical structure, or can be a logical structure. In other words, some units can be implemented by the same physical entity, or some units can be implemented by a plurality of physical entities or implemented jointly by some components in a plurality of independent devices.

In the above-mentioned embodiments, the hardware unit or module can be implemented in a mechanical manner or an electrical manner. For example, a hardware unit, a module, or a processor can include a dedicated permanent circuit or logic (for example, a dedicated processor, an FPGA, or an ASIC) to complete a corresponding operation. The hardware unit or the processor can further include programmable logic or circuits (for example, a general-purpose processor or another programmable processor), and can be temporarily disposed by the software, to complete a corresponding operation. A specific implementation (a mechanical manner, a dedicated permanent circuit, or a temporarily disposed circuit) can be determined in considerations of costs and time.

The specific implementations described above with reference to the accompanying drawings describe example embodiments, but do not represent all embodiments that can be implemented or fall within the protection scope of the claims. The term "example" used throughout this specification means "used as an example, an instance, or an illustration" and does not mean "preferred" or "advantageous" over other embodiments. For the purpose of providing an understanding of the described technology, a specific implementation includes specific details. However, these technologies can be implemented without these specific details. In some instances, to avoid obscuring the described concepts in the embodiments, well-known structures and apparatuses are shown in the form of a block diagram.

The above-mentioned descriptions of content of this disclosure are provided to enable any person of ordinary skill in the art to implement or use the content of this disclosure. It is obvious to a person of ordinary skill in the art that various modifications can be made to the content of this disclosure. In addition, the general principle defined in this specification can be applied to another variant without departing from the protection scope of the content of this disclosure. Therefore, the content of this disclosure is not limited to the examples and designs described in this specification, but is consistent with the widest range of principles and novelty features that conform to this specification.

What is claimed is:

1. A table data query method applied to a distributed database, wherein the method is performed by a table data query apparatus in a table data processing node, and the table data query method comprises:
   in response to that the table data processing node executes a first execution plan to read row data of a driving table, determining whether a cache apparatus of the table data processing node caches the row data;
   generating a data rescanning instruction upon determining that the cache apparatus caches the row data, wherein the data rescanning instruction comprises a row number of the row data;
   sending the data rescanning instruction to a driven table scanning scheduling apparatus of the table data processing node, to instruct the driven table scanning scheduling apparatus to read a corresponding driven table data query result from an intermediate result storage apparatus based on the row number of the row data, wherein the driven table data query result was stored in the intermediate result storage apparatus in correspondence with the row number of the row data; and
   obtaining the driven table data query result from the driven table scanning scheduling apparatus.

2. The table data query method according to claim 1, further comprising:
   generating a data scanning instruction upon determining that the cache apparatus does not cache the row data, wherein the data scanning instruction comprises the row number of the row data;
   storing the read row data of the driving table in the cache apparatus; and
   sending the data scanning instruction to the driven table scanning scheduling apparatus, to instruct the driven table scanning scheduling apparatus to schedule each corresponding driven table storage node to execute a second execution plan to obtain the driven table data query result, wherein the second execution plan is a distributed execution plan deployed in each driven table storage node, wherein
   the driven table data query result of each corresponding driven table storage node is returned to the driven table scanning scheduling apparatus, and is stored, in a correspondence with the row number of the row data, in the intermediate result storage apparatus.

3. The table data query method according to claim 2, wherein generating a data scanning instruction upon determining that the cache apparatus does not cache the row data comprises:
   determining a condition extrapolation parameter corresponding to the row data upon determining that the cache apparatus does not cache the row data; and
   generating the data scanning instruction based on the condition extrapolation parameter corresponding to the row data, wherein the data scanning instruction is used to instruct the driven table scanning scheduling apparatus to schedule each corresponding driven table storage node to execute the second execution plan in a case of the condition extrapolation parameter to obtain the driven table data query result.

4. The table data query method according to claim 2, further comprising:
   determining a condition extrapolation parameter corresponding to the row data upon determining that the cache apparatus does not cache the row data, wherein the condition extrapolation parameter and the data scanning instruction are delivered together by the driven table scanning scheduling apparatus to the corresponding driven table storage node.

5. The table data query method according to claim 3, wherein determining a condition extrapolation parameter corresponding to the row data upon determining that the cache apparatus does not cache the row data comprises:
   determining the condition extrapolation parameter corresponding to the row data based on a row value of a join column in the row data upon determining that the cache apparatus does not cache the row data.

6. The table data query method according to claim 1, wherein the first execution plan comprises a nested execution plan, and generating a data rescanning instruction upon determining that the cache apparatus caches the row data comprises:

generating the data rescanning instruction upon determining that the cache apparatus caches the row data and the row data is read in response to that the table data processing node executes an innermost execution plan of the nested execution plan.

7. The table data query method according to claim 2, wherein the first execution plan comprises a nested execution plan, and generating a data scanning instruction upon determining that the cache apparatus does not cache the row data comprises:

generating the data scanning instruction upon determining that the cache apparatus does not cache the row data or the row data is not read in response to that the table data processing node executes an innermost execution plan of the nested execution plan.

8. The table data query method according to claim 6, wherein the innermost execution plan of the nested execution plan is identified by an optimizer in an execution plan compilation phase.

9. The table data query method according to claim 2, wherein the second execution plan scheduled by the driven table scanning scheduling apparatus comprises at least two second distributed execution subplans, and respective processing results of all the second distributed execution subplans are transmitted between the second distributed execution subplans by using the intermediate result storage apparatus.

10. The table data query method according to claim 1, wherein the table data processing node comprises a table join node or a subquery node.

11. A distributed data system, comprising:

at least one driving table storage node, configured to store row data of a driving table;

a table data processing node; and at least two driven table storage nodes, wherein a driven table is stored in some or all of the at least two driven table storage nodes, wherein the table data processing node is configured to be applied to a distributed database and comprises:

a table data query apparatus, configured to:

in response to that the table data processing node executes a first execution plan to read row data of the driving table, determine whether a cache apparatus of the table data processing node caches the row data;

generate the data rescanning instruction when the cache apparatus caches the row data, wherein the data rescanning instruction comprises the row number of the row data;

send the data rescanning instruction to a driven table scanning scheduling apparatus of the table data processing node, to instruct the driven table scanning scheduling apparatus to read a corresponding driven table data query result from an intermediate result storage apparatus based on the row number of the row data, wherein the driven table data query result was stored in the intermediate result storage apparatus in correspondence with the row number of the row data; and obtain the driven table data query result from the driven table scanning scheduling apparatus.

12. A table data query apparatus applied to a distributed database, comprising a memory and a processor, wherein the memory stores executable instructions that, in response to execution by the processor, cause the processor to:

in response to that the table data processing node executes a first execution plan to read row data of a driving table, determine whether a cache apparatus of the table data processing node caches the row data;

generate a data rescanning instruction upon determining that the cache apparatus caches the row data, wherein the data rescanning instruction comprises a row number of the row data;

send the data rescanning instruction to a driven table scanning scheduling apparatus of the table data processing node, to instruct the driven table scanning scheduling apparatus to read a corresponding driven table data query result from an intermediate result storage apparatus based on the row number of the row data, wherein the driven table data query result was stored in the intermediate result storage apparatus in correspondence with the row number of the row data; and obtain the driven table data query result from the driven table scanning scheduling apparatus.

13. A non-transitory computer-readable storage medium, comprising instructions stored therein that, when executed by a processor of a computing device, cause the processor to:

in response to that the table data processing node executes a first execution plan to read row data of a driving table, determine whether a cache apparatus of the table data processing node caches the row data;

generate a data rescanning instruction upon determining that the cache apparatus caches the row data, wherein the data rescanning instruction comprises a row number of the row data;

send the data rescanning instruction to a driven table scanning scheduling apparatus of the table data processing node, to instruct the driven table scanning scheduling apparatus to read a corresponding driven table data query result from an intermediate result storage apparatus based on the row number of the row data, wherein the driven table data query result was stored in the intermediate result storage apparatus in correspondence with the row number of the row data; and obtain the driven table data query result from the driven table scanning scheduling apparatus.

* * * * *